Figures 1, 2:
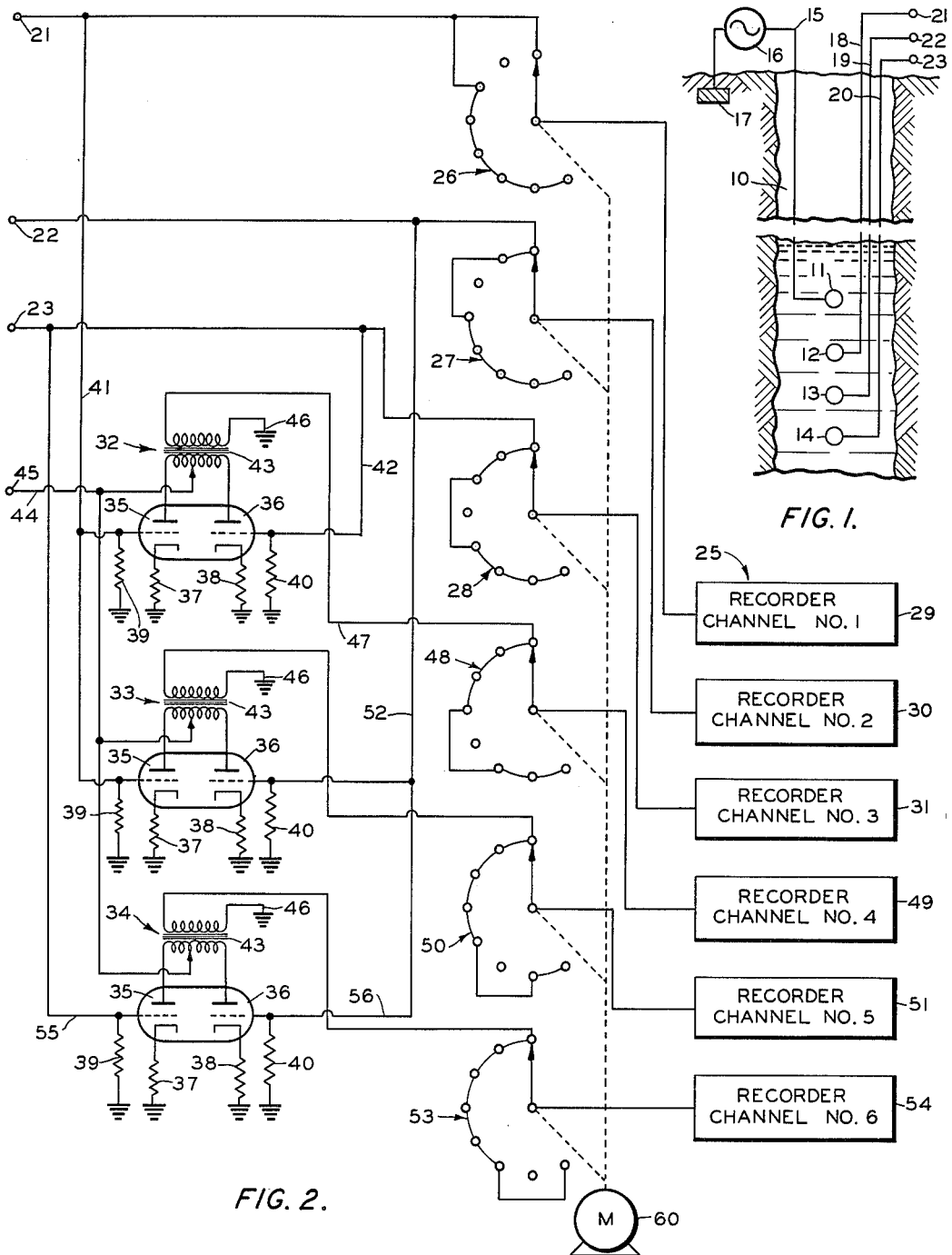

April 17, 1956  F. L. McMILLAN, JR  2,742,605
COUPLING CIRCUIT
Filed Dec. 27, 1949

INVENTOR.
F. L. McMILLAN, JR.
BY Hudson & Young
ATTORNEYS

United States Patent Office 2,742,605
Patented Apr. 17, 1956

2,742,605

COUPLING CIRCUIT

Fred L. McMillan, Jr., Bartlesville, Okla., assignor to Phillips Petroleum Company, a corporation of Delaware Application December 27, 1949, Serial No. 135,280

6 Claims. (Cl. 324—1)

This invention relates to electric well logging. In another aspect, it relates to a coupling circuit for feeding potentials picked up at one or more electrodes in a well to a common recorder. In still another aspect, it relates to a coupling circuit embodying a novel switching device for properly identifying several traces upon a common recording medium.

In electrical well logging, a plurality of electrodes are positioned within a well bore or drill hole in fixed, spaced positions relative to one another. An alternating voltage is applied between one of these electrodes, usually termed the generating electrode, and ground, the potentials thereby induced upon the other electrodes, usually termed pickup electrodes, being carried to the surface by suitable conductors and recorded. Where two pickup electrodes are utilized, it is desirable to measure the potential of each such pickup electrode with respect to ground. Such a measurement is referred to as a two electrode log since the generating electrode and pickup electrode are used in each such measurement. It is also dseirable to measure the potential difference between the two pickup electrodes, and record this potential upon the same medium as that which is used for recording the two electrode logs. Where the relative potential difference between the two pickup electrodes is measured, the operation is referred to as a three electrode log since each such measurement involves the use of the generating electrode and two pickup electrodes.

Where more than two pickup electrodes are utilized, it is desirable to provide a two electrode log for each pickup electrode showing the potential of such electrode with respect to ground together with a plurality of three electrode logs, the potential difference between a preselected pair of pickup electrodes being measured by each such three electrode log. As stated, it is desirable that all of these logs be recorded upon a common tape or other medium to the end that the various logs may be readily compared. The provision of a large number of two and three electrode logs simultaneously has heretofore involved the use of complicated filter circuits, switching mechanisms, and mixing circuits.

Difficulties have also been experienced in properly identifying a number of traces produced on a single recording medium, particularly in electrical well logging, wherein the several traces are of rather irregular contour and may overlap during a part of their range. Similar difficulties are experienced in recording systems for seismometers where, again, it is desirable to provide a number of separate traces upon a recording medium, since these traces are oftentimes quite irregular and overlap throughout portions of the recording.

It is an object of this invention to provide a novel type of mixing circuit to the end that various combinations of two and three electrode logs may be simultaneously recorded upon a common tape or other recording medium.

It is a further object to provide a coupling circuit for connecting a plurality of inputs to a common recording device embodying means for sequentially interrupting the traces produced on the recording medium to allow easy identification of the same even though the adjacent recordings may approach each other very closely or even overlap.

It is a still further object to provide a coupling circuit enabling ready identification of individual electrode or seismometer records where a plurality of such records are recorded on a common tape.

It is a still further object to provide a circuit which is simple in construction, reliable in operation, and utilizes a minimum number of standard circuit components.

Various other objects, advantages and features of the invention will become apparent from the following detailed description taken in conjunction with the accompanying drawings, in which:

Figure 1 is a diagrammatic view of a bore hole or drill hole having a number of logging electrodes suspended therein; and Figure 2 is a schematic diagram of the coupling circuit of this invention.

Referring now to Figure 1, a liquid-filled drill hole 10 has a generating electrode 11 and a plurality of pickup electrodes 12, 13 and 14 suspended therein. Generating electrode 11 is connected by a conductor 15 to one terminal of a generator or other alternating current source 16, the other terminal of which is grounded, as by a plate 17. The pickup electrodes 12, 13 and 14 are connected, respectively, by conductors 18, 19 and 20 to terminals 21, 22 and 23 which, in turn, are connected to the novel coupling circuit in the manner hereinafter to be described in detail.

As stated, the showing of Figure 1 is diagrammatic and it will be understood that the conductors 15, 18, 19 and 20 normally form an integral part of a cable which is lowered into the drill hole and suspends therein an electrode structure of the type shown in my co-pending application, Serial No. 88,787, filed April 21, 1949, entitled Apparatus for Electrical Well Logging, now Patent No. 2,653,294. The cable is, of course, suspended by a suitable windlass and pulley structure so that the electrode-carrying tool may be raised and lowered in the well, as desired. It is to be further understood that the invention is not limited to three pickup electrodes, as shown, but any suitable number may be used with certain modifications which will become apparent to those skilled in the art as the description proceeds.

In the operation of the logging system of Figure 1, a potential is impressed between generating electrode 11 and ground plate 17 by generator 16. For practical purposes, ground plate 17 may be assumed to be an infinite distance from the electrodes so that the potential gradient is uniform in the regions adjacent the electrodes except as it is modified by the character and extent of the formations adjoining the drill hole together with the conductivity and other electrical properties of the liquid or mud in the drill hole. The voltage impressed upon generating electrode 11 causes the electrodes 12, 13 and 14 to assume a potential with respect to ground which is dependent upon the character of the adjoining formations together with any spontaneous potentials which may be independently impressed upon the electrodes. By continuously recording the potential on each of the pickup electrodes as the electrode structure is moved vertically in the well, valuable information may be deduced concerning the nature and location of the subterranean strata. Further valuable information may be obtained by continuously measuring the potential difference between preselected pairs of electrodes. For example, in the case shown, it may be desirable to simultaneously measure the potential difference between electrode set 12, 13 electrode set 12, 14 and electrode set 13, 14.

In accordance with the invention, all of these potentials are simultaneously recorded upon a common unit 25, Figure 2, by the use of the novel coupling circuit shown in this figure. It will be noted that the terminals 21, 22 and 23 of Figure 1 are connected, respectively, to the stationary terminals of switch units 26, 27 and 28. The arms of switch units 26, 27 and 28 are connected, respectively, to channels 29, 30 and 31 of the common recorder unit 25. Thus, the channels 29, 30 and 31 continuously record the potentials of the respective electrodes 12, 13 and 14 with respect to ground, thereby to afford a two electrode log for each of the pickup electrodes. The electrodes are further connected in pairs to the input terminals of three identical mixing circuits 32, 33 and 34. The mixing circuit 32 includes two triodes 35 and 36, the cathodes of which are connected to ground through bias resistors 37, 38 of equal ohmic value. The control grids of the triodes 35, 36 are connected to ground through grid resistors 39, 40 of equal ohmic value and to conductors 41, 42 which are connected, respectively, to terminals 21, 23 and electrodes 12, 14. The anodes of triodes 35, 36 are connected in phase opposition to the primary winding of an output transformer 43, this winding having a center-tap which is connected by a lead 44 to a positive power supply terminal 45. The secondary winding of transformer 43 has one terminal thereof grounded at 46, the other terminal being connected by a lead 47 to stationary contacts of a switch unit 48, the arm of which is connected to a recorder channel 49.

In operation, the control grids of triodes 35, 36 are maintained at the same potential as that of the electrodes 12 and 14, respectively. However, the control grids do not draw any appreciable current and, therefore, do not affect the voltage fed to recorder channels 29, 30 and 31. The potential impressed upon the control grids controls the flow of current through the respective triodes to output transformer 43. Since the anodes are connected in opposition to the primary winding of this transformer, the voltage induced in the secondary winding is proportional to the difference in the anode currents of the two tubes and, therefore, proportional to the potential difference between the control grids of the tubes which, in turn, is equal to the potential difference between electrodes 12, 14. This voltage representative of the potential difference between the electrodes is fed to recorder channel 49 and constitutes a three electrode log utilizing electrodes 11, 12 and 14.

In similar fashion, mixing circuit 33 produces an output proportional to the potential difference between electrodes 12, 13, this voltage being fed to the stationary contacts of a switch unit 50, the arm of which is connected to a recorder channel 51. In this connection, it will be noted that one control grid of mixing circuit 33 is connected by lead 41 to terminal 21 and electrode 12 while the other control grid is connected by a lead 52 to terminal 22 and electrode 13. In the same manner, mixing circuit 34 produces an output voltage which is proportional to the potential difference between electrodes 13, 14, this voltage being fed to the stationary contacts of a switch unit 53, the arm of which is connected to a recorder channel 54. In this connection, it will be noted that one control grid is connected by a lead 55 to terminal 23 and electrode 14 while the other control grid is connected by a lead 56 to lead 52, terminal 22, and contact 13.

It will be apparent, therefore, that the mixing circuits 32, 33 and 34 of this invention produces three electrode logs which are continuously recorded by channels 49, 51 and 54. In particular, channel 49 records the potential difference between electrodes 12, 14 while channel 51 records the potential difference between electrodes 12, 13 and channel 54 records the potential difference between electrodes 13 and 14. These three simultaneous recordings are made without drawing any appreciable current from the electrodes with the result that the potentials recorded in channels 29, 30 and 31 are accurate and are not influenced by the simultaneous recording of the three electrode logs.

Further in accordance with the invention, all of the stationary contacts except one of each of the switch units 26, 27, 28, 48, 50 and 53 are interconnected, and these interconnected terminals engage a conductor impressing the appropriate voltage upon the switch. Further, each switch unit has one "floating" or unconnected contact and this unconnected contact is in a different position in each channel. Finally, all of the switch units are ganged and, as an optional feature of the invention, the ganged switches may be connected to a motor 60. As a result, if the switch units are moved rapidly in a counterclockwise direction, Figure 2, the flow of current to the recorder channels 29, 30, 31, 49, 51 and 54 is momentarily and sequentially interrupted. In particular, with the switch arms in the position shown, each recorder channel is connected to its appropriate voltage source. As the switch moves in a counterclockwise direction, the current to recorder channel 29 is momentarily interrupted as the arm of switch unit 26 engages the unconnected contact but there is no effect on any of the other recorder channels. As movement of the switch continues, the current to channels 30, 31, 49, 50 and 45 is interrupted, in sequence, in a similar manner. Finally, when the switch reaches the end of its travel, all of the recorder channels are again connected to their voltage sources. This, of course, produces a series of short interruptions upon the recorder traces, there being first a momentary break in the trace corresponding to channel 1 followed sequentially by short breaks in the traces produced by channels 2, 3, 4, 5 and 6. This enables the traces to be readily identified at any desired intervals by a rapid movement of the ganged switch, even though the traces lie closely adjacent to each other or even overlap. The switch may be actuated manually, if desired, at any suitable time during the recording or it may be operated at intervals by motor 60 in an automatic manner. It will be apparent that the switch structure disclosed may be readily utilized to identify the traces of a number of seismographs on a common recording medium in an entirely similar manner.

Preferably, the recorder is of the type disclosed in the co-pending application of Raymond G. Piety and Fred L. McMillan, Jr., Serial No. 117,338, filed September 23, 1949, entitled Pulse Measuring Apparatus, now Patent No. 2,718,449. A separate unit, as described in this application, may be used for each channel or, alternatively, a single facsimile mechanism may be utilized for a number of recording channels. It will be apparent that I have attained the objects of my invention in providing a coupling circuit by which a number of two and three electrode logs may be simultaneously recorded upon a common tape without impairing the accuracy of any such recording. Moreover, I have disclosed a device permitting easy and quick identification of any desired trace of a multi-channel recording, such as a record of a number of seismometers or the outputs of a number of well logging electrodes combined in a preselected manner.

While the invention has been described in connection with a present, preferred embodiment thereof, it is to be understood that this description is illustrative only and is not intended to limit the invention, the scope of which is defined by the appended claims.

I claim:

1. In an electrical well logging system, in combination, a first electrode suspended in a drill hole, means for applying a voltage between said first electrode and a point of reference potential, second and third electrodes suspended in the drill hole in spaced relation with one another and with said first electrode, a multi-channel recorder, means connecting said second electrode and said point of reference potential to the first channel of said recorder such that the voltage between said second electrode and said point of reference potential is applied to said first channel, means connecting said third electrode and said point of reference potential to the second channel of said recorder whereby the voltage between said third electrode and said point of reference potential is applied to said second channel, a pair of electron tubes each having an anode, a cathode and a control grid, means connecting the cathodes of each of said tubes to said point of reference potential, means connecting said second electrode to the control grid of the first of said tubes, means connecting said third electrode to the control grid of the second of said tubes, a transformer, one end terminal of the primary winding of said transformer being connected to the anode of the first of said tubes and the second end terminal of said primary transformer winding being connected to the anode of the second of said tubes, means connecting the center tap of said primary transformer winding to a point of potential which is more positive than said point of reference potential, means connecting the secondary winding of said transformer to the third channel of said recorder whereby the voltage applied to said third channel is proportional to the potential difference between said second and third electrodes, the three channels of said recorder being synchronized with one another whereby the voltages applied to the individual channels can be compared with one another, and means for interrupting sequentially the voltages applied to said first, second and third recorder channels, each interruption lasting a short interval, whereby the three recorded traces can readily be identified.

2. In an electrical well logging system, in combination, a first electrode suspended in a drill hole, means for applying a voltage between said first electrode and a point of reference potential, second and third electrodes suspended in a drill hole in spaced relation with one another and with said first electrode in a generally vertical direction, a multi-channel recorder, means connecting said second electrode and said point of reference potential to the first channel of said recorder whereby the voltage between said second electrode and said point of reference potential is applied to said first channel, means connecting said third electrode and said point of reference potential to the second channel of said recorder whereby the voltage between said third electrode and said point of reference potential is applied to said third channel, circuit means to provide a voltage of magnitude proportional to the difference in potential between said second and third electrodes, means for applying said last-mentioned voltage to the third channel of said recorder, the individual channels of said recorder being synchronized with one another whereby the voltages applied to said three channels can be compared with one another, and means for interrupting sequentially the voltages applied to said first, second and third recorder channels, each interruption lasting a short interval, whereby the three recorded traces can readily be identified.

3. A recording system comprising, in combination, a multi-channel recorder adapted to provide a plurality of traces on a common recording medium, a plurality of input circuits, each of said input circuits being connected to a respective channel of said recorder, a plurality of switches, one connected in each of said input circuits, and motor driven means to open each of said plurality of switches in sequence for short intervals so as to disconnect the associated input circuit from said recorder whereby the individual traces on said recording medium can readily be identified by the resulting interruptions.

4. A recording system comprising, in combination, a multi-channel recorder adapted to provide a plurality of traces on a common recording medium, a plurality of input circuits, each of said input circuits being connected to a respective channel of said recorder, a plurality of switch units, said switch units being connected in respective ones of said input circuits, each of said switch units including a contact arm and a plurality of terminals, means for moving the contact arms of said plurality of switch units in unison whereby said contact arms engage their respective plurality of terminals sequentially, means interconnecting all but one of the individual terminals in each of said units, said one terminals being different in each of said units whereby said plurality of input circuits are interrupted sequentially by movement of said switch arms in unison.

5. The combination in accordance with claim 4 wherein said means for moving said switch comprises a motor which is energized periodically.

6. In an electrical well logging system, in combination, a first electrode suspended in a drill hole, means to apply a voltage between said first electrode and a point of reference potential, second and third electrodes suspended in a drill hole in spaced relation with one another and with said first electrode in a generally vertical direction, a multi-channel recorder, means connecting one of said second and third electrodes and said point of reference potential to the first channel of said recorder so that the voltage between said one electrode and said point of reference potential is applied to said first channel, circuit means to provide a voltage of magnitude proportional to the difference in potential between said second and third electrodes, means for applying said last-mentioned voltage to a second channel of said recorder, the individual channels of said recorder being synchronized with one another so that the voltages applied to the first and second channels can be compared with one another, and means for interrupting sequentially the voltages applied to said first and second channels, each interruption lasting a short interval, whereby the two recorded traces can readily be identified.

References Cited in the file of this patent

UNITED STATES PATENTS

| | | |
|---|---|---|
| 1,961,367 | Kuhn | June 5, 1934 |
| 2,265,768 | Athy et al. | Dec. 9, 1941 |
| 2,265,978 | Batchelder | Dec. 16, 1941 |
| 2,317,632 | Miller | Apr. 27, 1943 |
| 2,321,971 | Becker | June 15, 1943 |
| 2,392,357 | Bays | Jan. 8, 1946 |
| 2,393,009 | Chun | Jan. 15, 1946 |
| 2,400,678 | Archie | May 21, 1946 |
| 2,415,364 | Mounce | Feb. 4, 1947 |
| 2,419,682 | Guillemin | Apr. 29, 1947 |
| 2,427,950 | Doll | Sept. 23, 1947 |
| 2,501,953 | Martin | Mar. 28, 1950 |
| 2,502,837 | Entz et al. | Apr. 4, 1950 |
| 2,504,931 | Knudsen | Apr. 18, 1950 |
| 2,543,608 | Stamper | Feb. 27, 1951 |
| 2,547,074 | Cirlin | Apr. 3, 1951 |
| 2,573,133 | Greer | Oct. 30, 1951 |
| 2,577,472 | Lewis | Dec. 4, 1951 |